(12) United States Patent
Fournier et al.

(10) Patent No.: US 6,553,840 B2
(45) Date of Patent: Apr. 29, 2003

(54) LINEAR DISPLACEMENT SENSOR APPARATUS

(75) Inventors: John A. Fournier, Somerset, MA (US); John Z. Buckley, III, W. Greenwich, RI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/941,263

(22) Filed: Aug. 28, 2001

(65) Prior Publication Data

US 2002/0039271 A1 Apr. 4, 2002

Related U.S. Application Data

(60) Provisional application No. 60/236,418, filed on Sep. 29, 2000.

(51) Int. Cl.$^7$ .................................................. G01L 9/12
(52) U.S. Cl. ........................................... 73/718; 73/724
(58) Field of Search ..................... 73/718, 724; 361/283

(56) References Cited

U.S. PATENT DOCUMENTS 4,382,377 A * 5/1983 Kleinschmidt et al. ........ 73/35
4,507,973 A * 4/1985 Barr et al. .................... 73/724
4,716,492 A * 12/1987 Charboneau et al. ......... 73/718
4,875,135 A    10/1989 Bishop et al.

* cited by examiner

Primary Examiner—Hezron Williams
Assistant Examiner—Alandra Ellington
(74) Attorney, Agent, or Firm—Russell E. Baumann; Frederick J. Telecky, Jr.

(57) ABSTRACT

A linear displacement sensor (10) has a capacitive transducer (24) having a flexible diaphragm (24c) disposed in a housing (12) which also slidingly mounts a plunger (18) movable toward and away from the diaphragm. The plunger has a spring seating end slidably received in a hollow tubular button (14) with a coil spring disposed in the tubular button between the spring seating end of the plunger and a spring seat of the button. Movement of the button caused by an element whose movement is to be monitored causes a change in the force applied to the diaphragm which is proportional to the movement of the button to provide a corresponding output signal by means of signal conditioning electronics (28) disposed in the housing.

6 Claims, 2 Drawing Sheets

LINEAR DISPLACEMENT SENSOR APPARATUS

This application claims priority under 35 USC Section 119(e)(1) of provisional application No. 60/236,418 filed Sep. 29, 2000.

FIELD OF THE INVENTION

This invention relates generally to sensors and more particularly to linear displacement sensors for use in aerospace control systems and the like for converting mechanical displacement inputs into electrical outputs.

BACKGROUND OF THE INVENTION

It is known to detect discrete actuator and/or actuator linkage positions in aerospace systems and the like using electromechanical limit switches or electronic proximity switches. These devices provide a change in an electrical output signal when the actuator reaches a selected position to trip the respective switch. It is also know to detect actuator position along a full range of travel using linear variable displacement transducers (LVDTs) based on the inductive relationship between a core movably mounted within a coil providing an electrical output proportional to the position of the core.

Electromechanical switches have a relatively low cycle life due to the inherent nature of mechanical switching parameters which change over time, including contacts to wear, blades to fatigue and the like. LVDTs and electronic proximity switches on the other hand, typically require expensive secondary electronics to interface with aerospace platforms and proximity switches have a further limitation in that they require the use of targets or special actuator material.

SUMMARY OF THE INVENTION

It is an object of the invention to provide a relatively low cost linear displacement sensor having long cycle life particularly useful in aerospace applications. Another object of the invention is the provision of an aerospace grade linear displacement sensor which overcomes the limitations in the prior art noted above.

Briefly described, an aerospace grade linear displacement sensor made in accordance with the invention includes a pushbutton movably mounted on a housing for applying a force through a spring to a movable capacitor plate disposed on a diaphragm of a variable parallel plate capacitive transducer disposed in the housing. The pushbutton comprises an elongated tubular member slidably received in a mounting sleeve portion forming a part of the housing. A coil spring is disposed inside the tubular pushbutton member with one end of the spring seated in a closed force receiving end of the tubular pushbutton member and the other end of the spring seated on the head of a plunger which extends to the diaphragm surface of the variable parallel plate capacitive transducer along an axis which is coaxial with the longitudinal axis of the transducer. The diaphragm of the variable parallel plate capacitive transducer is sealingly attached to a first face surface of a substrate with electrical terminals extending through the substrate to an opposite second face surface. An electronics chamber is formed in the housing on the second face surface side with signal conditioning electronics disposed in the chamber connected to the terminals and to output leads which extend outside the housing.

BRIEF DESCRIPTION OF THE DRAWINGS

Other objects, advantages and details of the novel and improved linear displacement sensor of the invention appear in the following detailed description of the preferred embodiments of the invention, the detail description referring to the drawings in which.

DETAILED DESCRIPTION OF THE PREFERRED EMBODIMENTS

Figure 1:
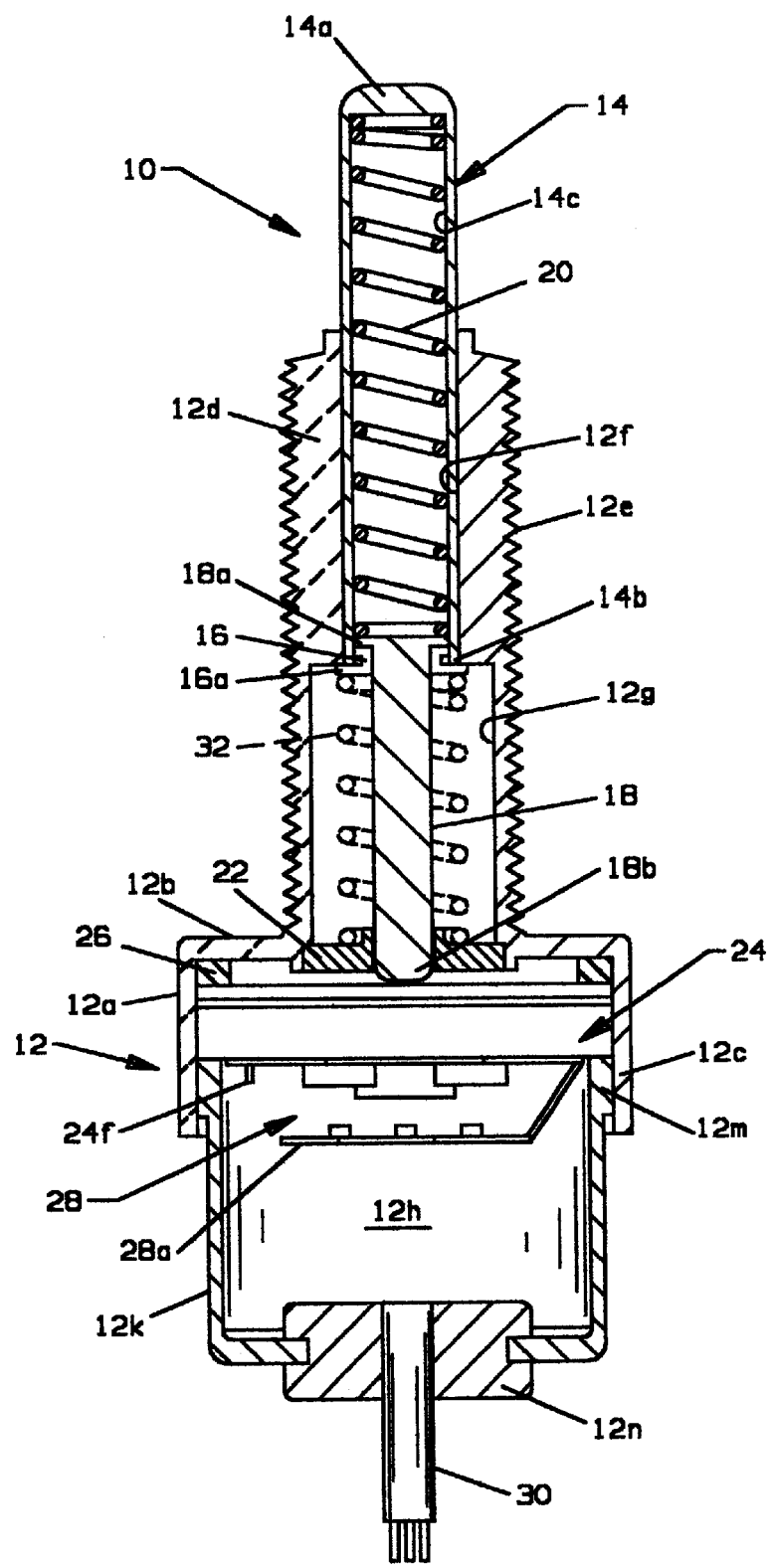
FIG. 1 is a cross sectional view of a linear displacement sensor made in accordance with the invention.
Figure 2:
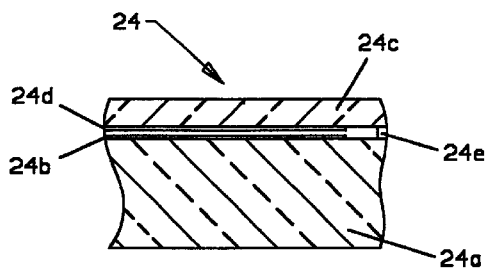
FIG. 2 is a broken away cross sectional view of the capacitive transducer shown in FIG. 1.

A linear displacement sensor 10 made in accordance with the invention comprises a housing 12 having an open ended generally cup-shaped first portion 12a having a top wall 12b and side walls 12c with an elongated mounting sleeve 12d extending from the top wall 12b. Mounting sleeve 12d is preferably provided with suitable attachment means such as threads 12e for attachment to an aircraft support or the like adjacent an actuator and/or actuator linkage of a control surface whose displacement is to be monitored. Sleeve 12d is formed of suitable material such as stainless steel and has a bore open at each opposite end extending along its entire length along the longitudinal axis having a first diameter 12f and a second larger diameter 12g. A tubular button 14 is slidable received in bore 12f and has a first closed end 14a and a second open end 14b attached to a collar 16. An elongated plunger 18 extends through collar 16 and is provided with a head portion having a radial, outwardly extending flange 18a which serves as a spring seat for coil spring 20 disposed in bore 14c and extending from closed end 14a to spring seat 18a. Collar 16 has a radially, outwardly extending flange 16a which receives the lower end of pushbutton member 14 for movement with member 14. Plunger 18, formed of suitable material such as stainless steel, is slidably received through the bore of a guide washer 22 of low friction material such as brass which is fixedly attached to mounting sleeve 12d. The distal free end 18b of plunger 18 is preferably rounded off to avoid any sharp surface to provide a smooth surface for engagement with a variable parallel plate capacitive transducer 24 to be discussed.

Capacitive transducer 24 is received in the closed end of first housing portion 12a with an annular ring gasket 26 disposed between the transducer and top wall 12b and comprises a substrate 24a formed of electrically insulative material such as alumina on which a stationary capacitor plate 24b is deposited and a relatively thin, flexible diaphragm or movable capacitor plate 24c, preferably of the same material having a parallel plate 24d deposited thereon in alignment with plate 24b. Diaphragm 24c is mounted on substrate 24a in parallel spaced apart relation by glass spacer material 24e. Preferably, when the sensor is to be used in aerospace applications, the space between the diaphragm and the substrate is vented as by forming air passages (not shown) through glass 24e, to prevent having a pressure differential which would vary with altitude and could cause an error in output voltage. The capacitive plates are interconnected to terminals, one terminal 24f being shown in FIG. 1, which extend through substrate 24a for connection to signal conditioning electronics 28, shown schematically, mounted on a suitable flex circuit 28a received in an electronics chamber 12h formed by a second cup-shaped housing portion 12k having a side wall forming an open end and formed with a flange 12m at its outer free end which is telescopically received within the open end of side wall 12c of first housing portion 12a. Housing portions 12a and 12k are suitably attached as by crimping the outer free end of side wall 12c over flange 12m. An output wire 30 extends through a grommet 12n for interconnection with the signal conditioning electronics 28. Capacitive transducers of the type shown are well known for sensing fluid pressure, as in automotive sensors, to convert hydraulic pressures into proportional linear output voltages. For a more complete description, reference may be had to U.S. Pat. No. 4,875,135, assigned to the assignee of the present invention, the disclosure of which is incorporated by this reference. Such transducers provide an electrical output corresponding to the applied pressure.

Figure 3:
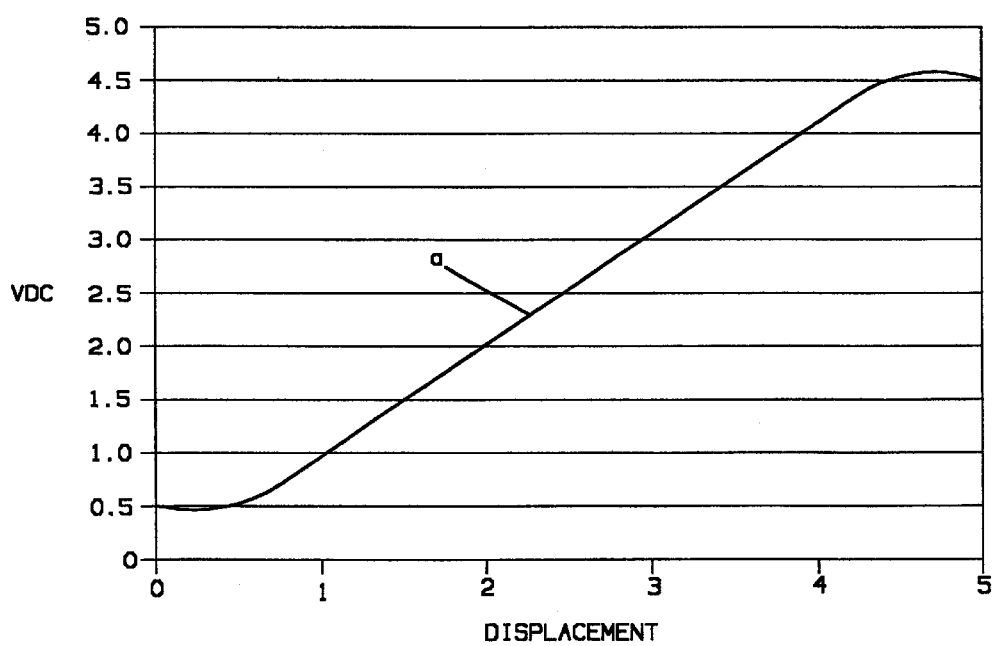
FIG. 3 is a graph showing output voltage versus displacement for a FIG. 1 sensor.

In use, sensor 10 is positioned adjacent to a control surface (not shown) whose linear position is to be monitored so that the distal end 14a of button 14 will be depressed either directly or through a suitable actuator and/or actuator linkage (not shown) connected to the control surface for at least a portion of its travel. Although shown slightly spaced from diaphragm 24c, plunger 18 may be biased against the plunger with a slight force in its zero, at rest position. Typically, approximately the last four to five hundreds of an inch is the portion of displacement of actuator movement of interest. For example, with regard to flight surfaces where a great deal of force is required for moving flaps or the like, it is desired to move such surfaces rapidly and once they come within a certain distance of the final position, e.g., approximately a half inch, to decelerate the movement. As seen in FIG. 3, a graph of voltage output (VDC) versus travel of button member 14 is shown for an exemplary sensor made in accordance with the invention. Movement of the button is reflected by line a so that a control mechanism (not shown) can be actuated at any selected point along line a through output lead 30. In the cited example, plunger 18 had a diameter of 0.100 inch and spring 20, used with a transducer design to measure up to approximately 40 psi, was selected to provide a maximum force of approximately 6 pounds.

According to a modified embodiment, an auxiliary stabilizing coil spring 32, shown in dashed lines in FIG. 1, can be placed in larger diameter section 12g between collar 16 and guide member 22 to effectively eliminate effects of vibration on the output in appropriate environments.

It should be understood that although preferred embodiments of the invention have been described by way of illustrating the invention, the invention includes all modifications and equivalents of the disclosed embodiments falling with within the scope of the appended claims. For example, it is within the purview of the invention to interpose a force spreading member between plunger 18 and diaphragm 24c, if desired.

What is claimed:

1. Linear displacement sensor apparatus comprising
   a pressure sensing transducer having a movable pressure sensing diaphragm,
   a housing defining a chamber in which the pressure sensing transducer is mounted,
   a plunger having a first spring seating head end portion and a second pressure transducer engaging portion,
   a hollow tubular button member slidably mounted in the housing and having a closed force receiving end disposed externally of the housing and having an open end which slidably receives the spring seating head end of the plunger, the plunger extending toward and into engagement with the pressure sensing diaphragm, and
   a coil spring received in the hollow tubular member between the closed end and the spring seating head of the plunger whereby inward movement of the button member causes an increase in force applied to the pressure sensing diaphragm.

2. Linear displacement sensor apparatus comprising
   a capacitive transducer having a flexible diaphragm mounted on a substrate in spaced apart parallel relationship therewith, a movable capacitor plate disposed on the diaphragm and a stationary capacitor plate disposed on the substrate in alignment with the movable capacitor plate, the transducer having a capacitance which varies with changes in the position of the movable plate relative to the stationary plate, transducer terminals electrically connected to the capacitor plates,
   a housing defining a chamber in which the capacitive transducer is received and forming an electronic circuit chamber, a plunger slidably mounted in the housing along a first axis aligned with and perpendicular to the diaphragm having a first end contiguous to the diaphragm and the second opposite end of the plunger forming a spring seat, an elongated hollow tubular member slidably mounted in the housing along a second axis coincident with the first axis, the tubular button member extending out of the housing and having a first closed force receiving end disposed outside the housing and an opposite open end receiving the second end of the plunger in sliding relation therewith, a coil spring received in the hollow tubular member extending between the spring seat of the plunger and the first closed force receiving end,
   signal conditioning electronics received in the electronic circuit chamber connected to the transducer terminals, and
   electrical output leads connected to the signal conditioning electronics and extending through an aperture of the housing, movement of the button member causing an increase in force placed by the plunger on the diaphragm reflecting a corresponding change in the output signal indicating the amount of travel of the button member.

3. Linear displacement sensor apparatus according to claim 1 in which the space between the capacitor plates is vented.

4. Linear displacement sensor apparatus according to claim 1 in which the housing comprises a first portion having a generally cup-shaped portion formed with an open end which houses the capacitive transducer therein and a second portion having a generally cup-shape formed with an open end which is telescopically received in the first portion and which engages the outer peripheral portion of the capacitive transducer.

5. Linear displacement sensor apparatus according to claim 1 further comprising a guide having a bore mounted in the housing and formed of relatively low friction material, the first end of the plunger being received through the bore of the guide.

6. Linear displacement sensor apparatus according to claim 1 further comprising a second coil spring extending between the tubular button member and a stationary spring seat to provide enhanced stability to the plunger.

* * * * *